United States Patent
Bishnoi et al.

(10) Patent No.: US 12,334,812 B2
(45) Date of Patent: Jun. 17, 2025

(54) METHOD AND A DEVICE FOR COMPENSATING A FAULTY SWITCH IN A MULTI-LEVEL FLYING CAPACITOR CONVERTER

(71) Applicant: ABB Schweiz AG, Baden (CH)

(72) Inventors: Hemant Bishnoi, Aargau (CH); Sami Pettersson, Dietikon (CH); Mario Schweizer, Rütihof (CH); Daniel Christen, Uster (CH); Gernot Riedel, Baden-Rütihof (CH)

(73) Assignee: ABB Schweiz AG, Baden (CH)

( * ) Notice: Subject to any disclaimer, the term of this patent is extended or adjusted under 35 U.S.C. 154(b) by 218 days.

(21) Appl. No.: 17/943,693

(22) Filed: Sep. 13, 2022

(65) Prior Publication Data

US 2023/0083355 A1 Mar. 16, 2023

(30) Foreign Application Priority Data

Sep. 14, 2021 (EP) .................................. 21196669

(51) Int. Cl.
*H02M 1/32* (2007.01)
*H02M 1/36* (2007.01)
*H02M 7/483* (2007.01)

(52) U.S. Cl.
CPC ........... *H02M 1/322* (2021.05); *H02M 1/325* (2021.05); *H02M 1/36* (2013.01); *H02M 7/4837* (2021.05)

(58) Field of Classification Search
CPC .. H02M 1/0067; H02M 1/007; H02M 1/0085; H02M 1/0095; H02M 1/32;
(Continued)

(56) References Cited

FOREIGN PATENT DOCUMENTS

CN 103516244 B 9/2017
EP 3787166 A1 3/2021
(Continued)

OTHER PUBLICATIONS

Amini et al., "A Fault-Diagnosis and Fault-Tolerant Control Scheme for Flying Capacitor Multilevel Inverters," *IEEE Transactions on Industrial Electronics*, 64(3): 1818-1826 (Nov. 3, 2016).
Chen et al., "Fault-tolerant Design for Flying Capacitor Multilevel Inverters," *2009 IEEE 6th International Power Electronics and Motion Control Conference (IPEMC)*, IEEE, 1460-1464 (May 17-20, 2009).
(Continued)

*Primary Examiner* — Thienvu V Tran
*Assistant Examiner* — Carlos O Rivera-Perez
(74) *Attorney, Agent, or Firm* — McCarter & English, LLP

(57) ABSTRACT

A system and method for compensating a faulty switch in a multi-level flying capacitor converter includes a converter capacitor arranged in parallel to an input, a first and second converter switches arranged respectively between first and second ends of the converter capacitor, first and second bypass switches respectively arranged in parallel to the first and second converter switches, wherein operation includes detecting a faulty converter level that includes at least one of the first and second converter switches, discharging all capacitors arranged in parallel to the input of the multi-level converter, wherein all capacitors comprise the converter capacitors and an input capacitor; closing the first and second bypass switches of the faulty converter level; adapting a modulation of the converter switches of the other converter levels; and restarting the multi-level converter.

12 Claims, 11 Drawing Sheets

(58) Field of Classification Search
CPC ........ H02M 1/322; H02M 1/325; H02M 1/36;
H02M 7/42; H02M 7/44; H02M 7/48;
H02M 7/4815; H02M 7/483; H02M
7/4833; H02M 7/4835; H02M 7/4837;
H02M 7/487; H02M 7/537; H02M
7/5387; Y02E 10/56; H02H 7/12; H02H
7/122; H02H 7/1225; H02H 7/1227
USPC ...... 363/13, 15–21.3, 34, 40–43, 50–58, 65,
363/71, 106, 109, 123, 131–134;
323/271–278, 282–285, 351; 361/59–61,
361/78, 79, 86, 87, 88–92
See application file for complete search history.

(56) References Cited

FOREIGN PATENT DOCUMENTS

| JP | 2015-42044 A | 3/2015 | |
|---|---|---|---|
| WO | WO-2020263288 A1 * | 12/2020 | .......... H02M 1/0095 |

OTHER PUBLICATIONS

Hu et al., "Reconfiguration of Carrier-based Modulation Strategy for Fault Tolerant Multilevel Inverters," *31st Annual Conference of IEEE Industrial Electronics Society, IECON* 2005, IEEE, 1048-1053 (Nov. 6-10, 2005).

Khan et al., "A Multilevel Modular Capacitor-Clamped DC-DC Converter," *IEEE Transactions on Industry Applications*, 43(6): 1628-1638 (Nov. 19, 2007).

Kou et al., "A Unique Fault-Tolerant Design for Flying Capacitor Multilevel Inverter," *IEEE Transactions on Power Electronics*, 19(4): 979-987 (Jul. 12, 2004).

Sheng et al., "A Fault Detection and Protection Scheme for Three-Level DC-DC Converters Based on Monitoring Flying Capacitor Voltage," *IEEE Transactions on Power Electronics*, 27(2): 685-697 (Jul. 7, 2011).

European Patent Office, Extended European Search Report in European Patent Application No. 21196669.2, 11 pp. (Feb. 22, 2022).

* cited by examiner

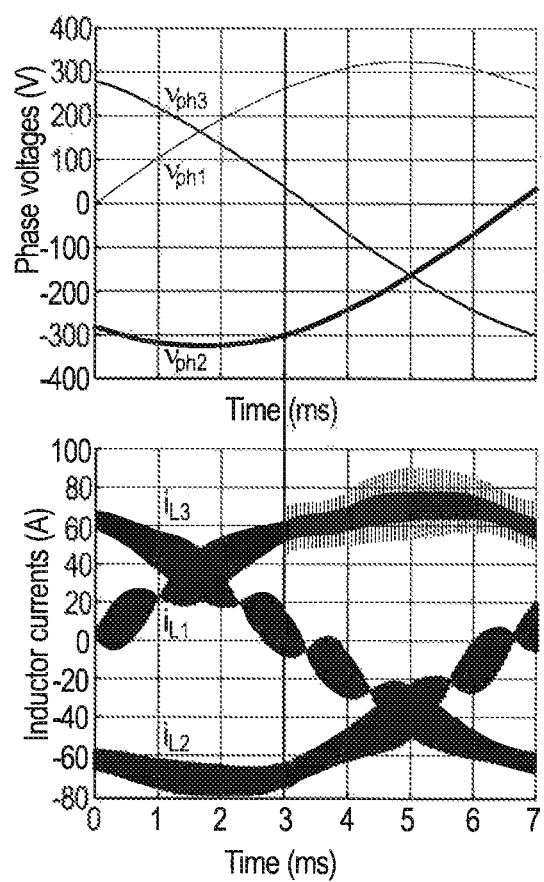
Fig. 9a
Fig. 9b
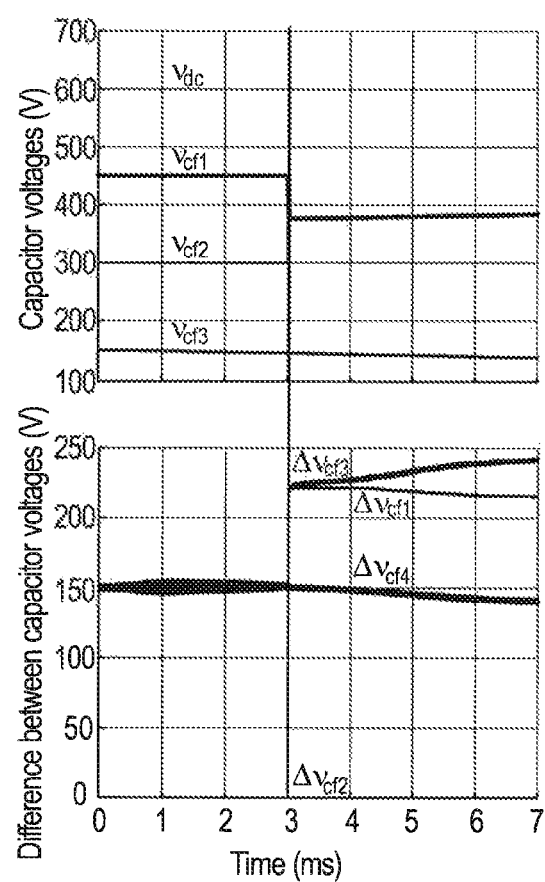
Fig. 9c
Fig. 9d

US 12,334,812 B2

1

METHOD AND A DEVICE FOR COMPENSATING A FAULTY SWITCH IN A MULTI-LEVEL FLYING CAPACITOR CONVERTER

CROSS-REFERENCE TO RELATED APPLICATIONS

This patent application claims priority to European Patent Application No. 21196669.2, filed on Sep. 14, 2022, which is incorporated herein in its entirety by reference.

FIELD OF THE DISCLOSURE

The present disclosure relates to multi-level flying capacitor converters, particularly of the type for compensating a faulty switch in a multi-level flying capacitor converter.

BACKGROUND OF THE INVENTION

A converter that uses a flying capacitor multilevel topology may bring many benefits, for instance a significant converter weight reduction. Hence, it is desirable to increase the availability of the multi-level flying capacitor converter.

BRIEF SUMMARY OF THE INVENTION

In a general aspect, the present disclosure provides an improved availability and/or reliability of a multi-level flying capacitor converter. This objective is achieved by the subject-matter of the independent claims. Further embodiments are evident from the dependent claims and the following description.

One aspect relates to a method for compensating a faulty switch in a multi-level flying capacitor converter, wherein each converter level of the multi-level converter comprises a converter capacitor, arranged in parallel to an input of the multi-level converter, a first converter switch and a second converter switch, arranged between a first end or a second end of the converter capacitor respectively, and a first bypass switch and a second bypass switch, arranged in parallel to the respective first converter switch and the respective second converter switch.

In an exemplary embodiment, a method includes the steps of: detecting a faulty converter level, wherein the faulty converter level comprises the first converter switch and/or the second converter switch being faulty; discharging all capacitors arranged in parallel to the input of the multi-level converter, wherein all capacitors comprise the converter capacitors and an input capacitor; closing the first bypass switch and the second bypass switch of the faulty converter level; adapting a modulation of the converter switches of the other converter levels; and restarting the multi-level converter.

The multi-level flying capacitor converter converts an input DC signal into an AC output signal. The AC output signal may have one phase or more phases, for example three phases. Embodiments of the multi-level converter may be designed for low voltages, e.g. 5 V, other embodiments may be designed for low voltages, e.g. in a voltage range of 230 V, 1 kV, and/or other voltage range, and another embodiments be designed for variable voltages. The power transformed by the multi-level converter may range between a few watts, up to a MW range.

BRIEF DESCRIPTION OF THE SEVERAL VIEWS OF THE DRAWING(S)

The drawings depict drawings of an embodiment or of a sub-circuit of an embodiment.

2

Figures 6A, 6B:
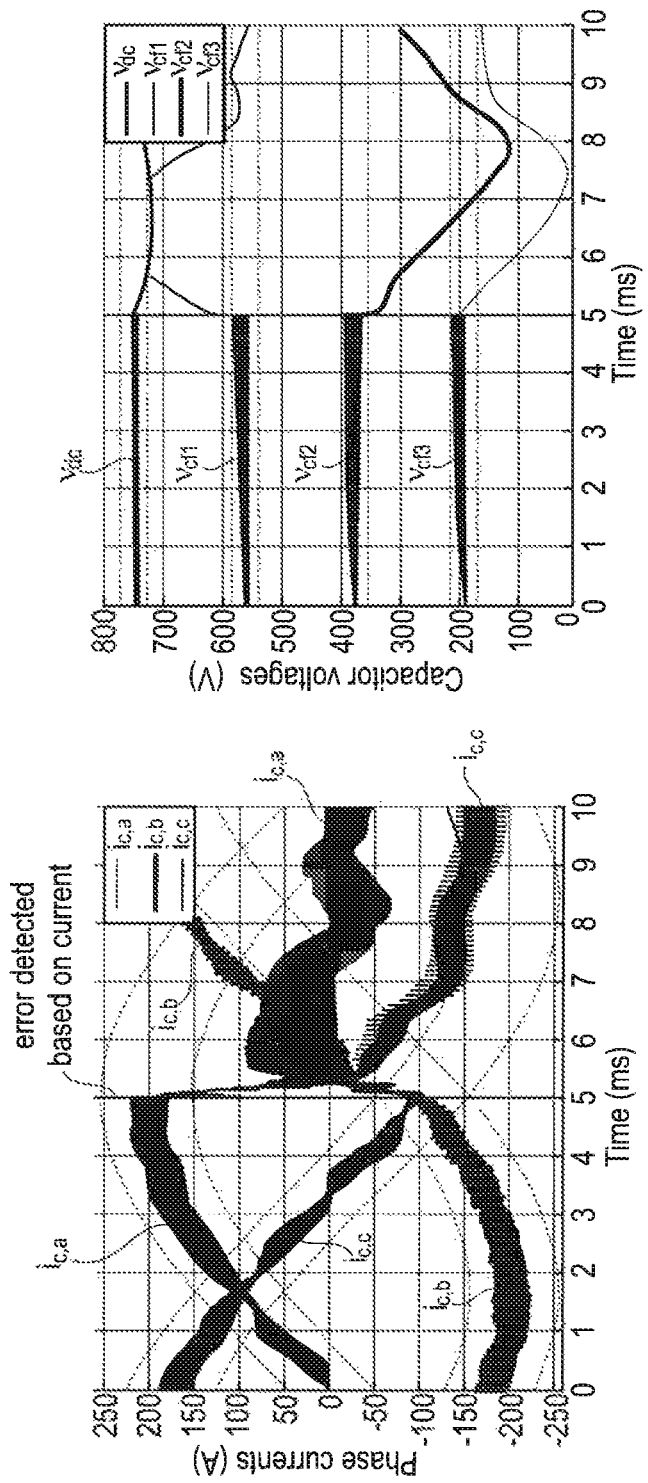

FIG. 6a and FIG. 6b schematically depict example of a rectifier operation of a 5-level flying capacitor system in accordance with the disclosure.

Figure 7B:
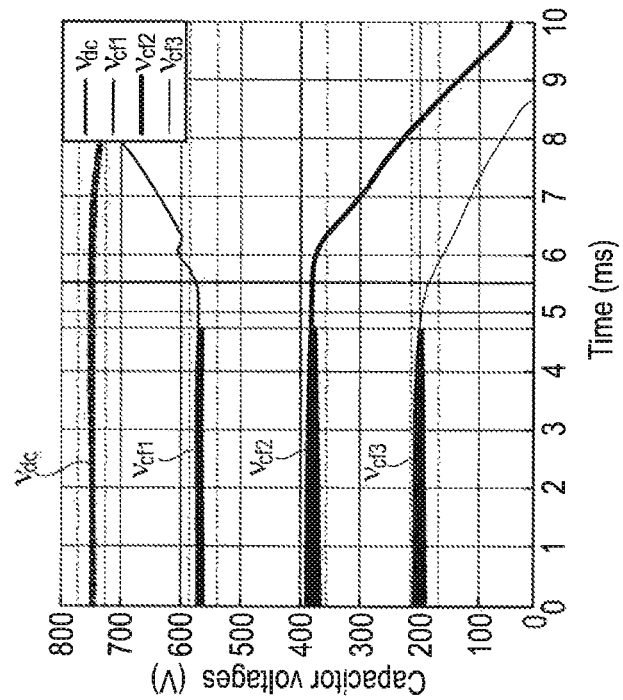
Figure 7A:
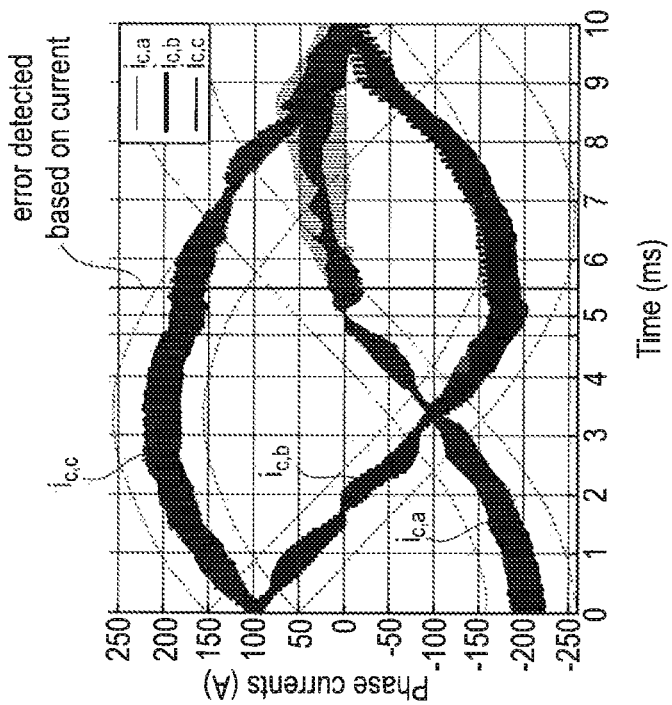

FIG. 7a and FIG. 7b schematically depict examples of another rectifier operation of a 5-level flying capacitor system in accordance with the disclosure.

Figure 8A:
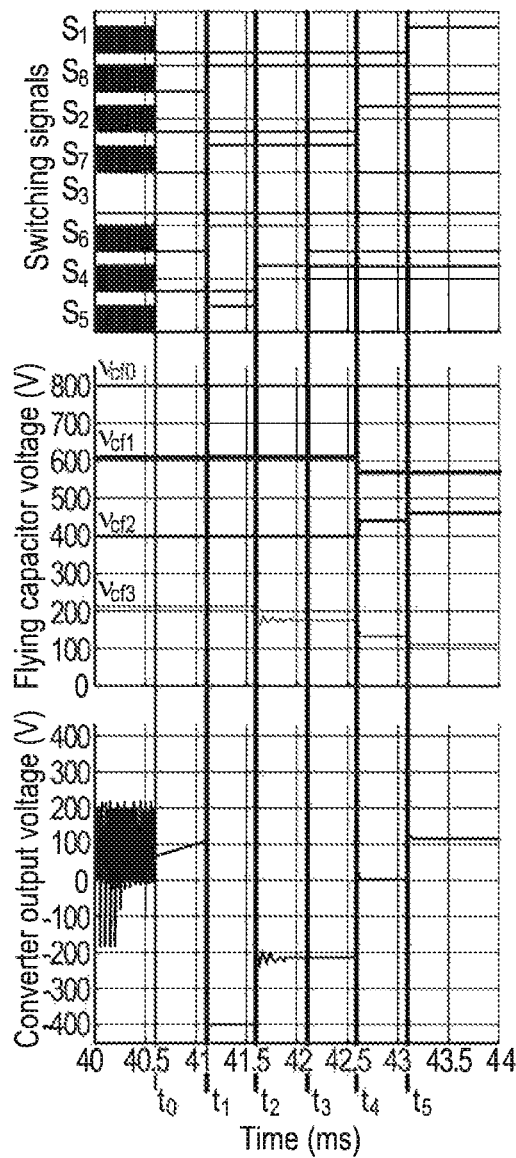
Figure 8B:
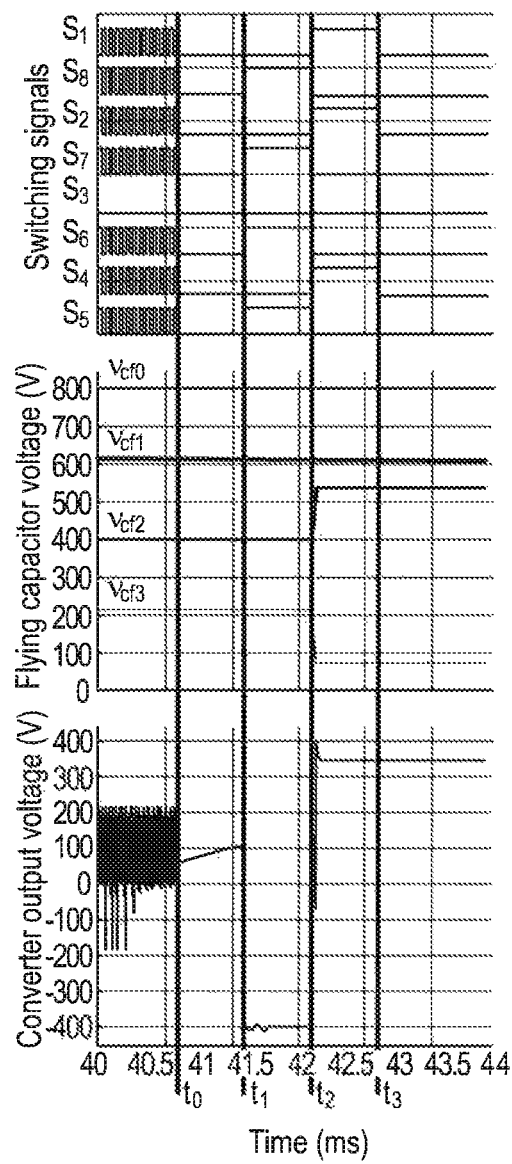

FIG. 8a and FIG. 8b schematically depict examples of test vectors to identify a faulty switching cell in accordance with the disclosure.

FIGS. 9a through 9d schematically depict characteristic waveforms when a short circuit error in a switching cell occurs, in accordance with the disclosure.

Figure 10:
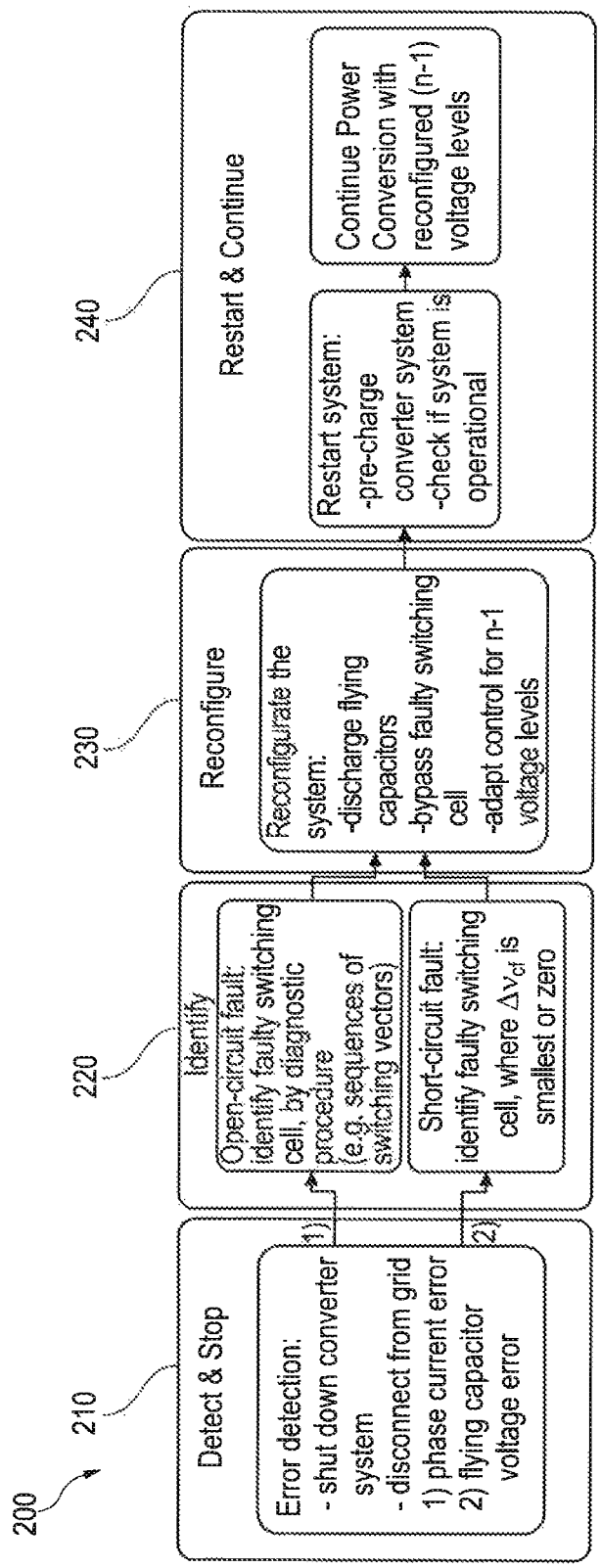

FIG. 10 schematically depicts a flowchart for a method of a fault handling strategy in accordance with the disclosure.

Figure 11:
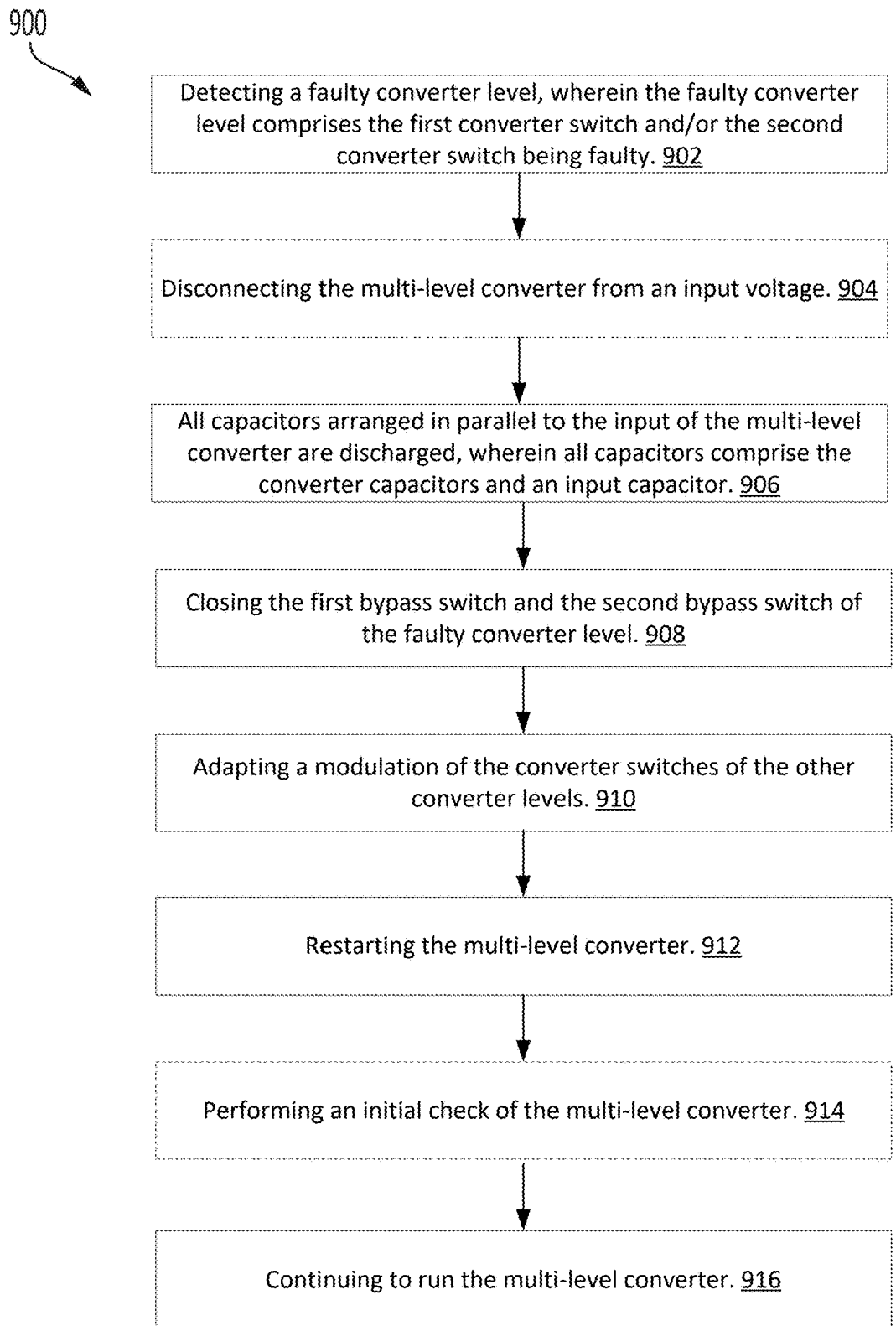

FIG. 11 a flow diagram for a method in accordance with the disclosure.

DETAILED DESCRIPTION OF THE INVENTION

Figure 1:
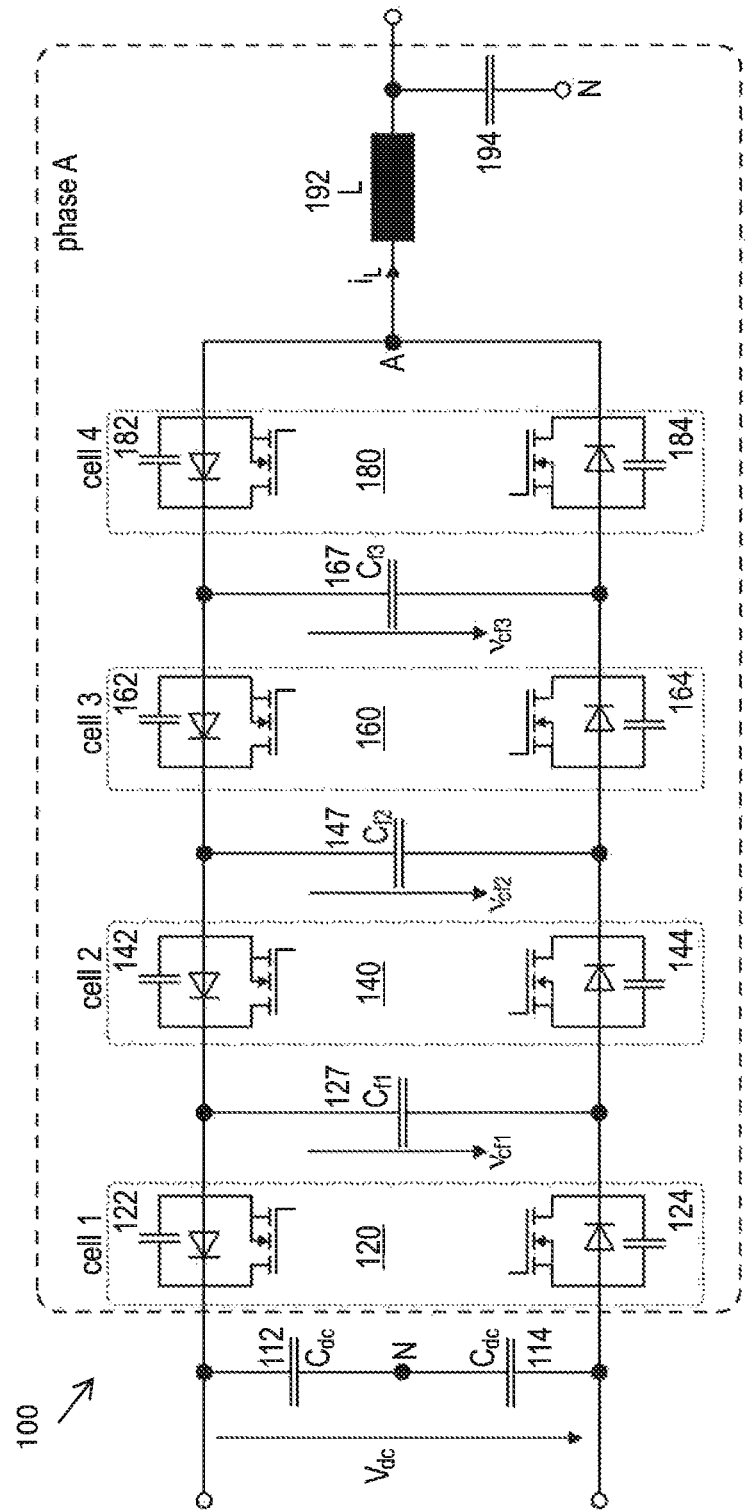
FIG. 1 is a schematic of an exemplary embodiment of a flying capacitor converter in accordance with the disclosure.

FIG. 1 shows schematically an example of a flying capacitor converter 100, particularly a 5-level flying capacitor converter comprising 4 flying capacitor cells. The converter shown depicts MOSFETs (metal-oxide-semiconductor field-effect transistors) as switches 122, 124, 142, 144, 162, 164, 182, 184; however, also other kind of switches may be used, for instance other types of FETs and/or bipolar transistors. For said switches in the flying capacitor converter system 100, there are two failure cases considered: An open-circuit failure, where the switch does not turn-on anymore, and a short-circuit failure, where the switch cannot be turned-off anymore. The detection of these two error cases based on the flying capacitor voltage and the inductor current measurement for different operating modes (inverter or rectifier) are described in detail below. Furthermore, a possible reconfiguration process is described in detail, which advantageously allows to reconfigure the system in a safe way without risking additional destruction of the system.

Figure 2B:
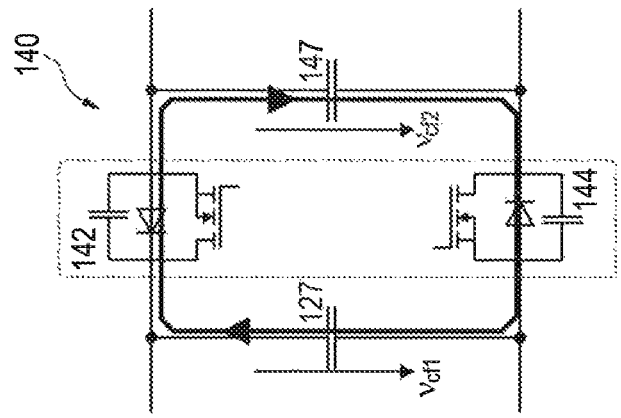
FIG. 2b is a schematic of an exemplary embodiment of a short-circuit failure in accordance with the disclosure.
Figure 2A:
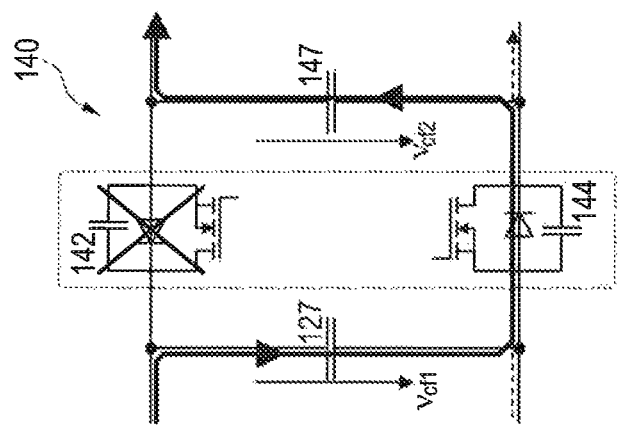
FIG. 2a is a schematic of an exemplary embodiment of an open-circuit failure in accordance with the disclosure.

FIG. 2a shows schematically an example of an open-circuit failure in an example cell 140. A converter switch 142 and/or 144 may fail by itself, and/or it may be possible that a gate drive circuit of the switch has failed. Either case may lead to a possible situation that the switch has failed in open circuit and cannot be turned-on again. In this scenario, a direction of a sinusoidal phase current $i_L$ (see, e.g., FIG. 1) is considered positive ($i_L>0$) and towards the grid. In the negative half-cycle ($i_L<0$), this direction reverses and the phase current is flowing towards the converter.

In the inverter mode (see, e.g., converter of FIG. 1, or waveforms as shown FIG. 4a and FIG. 4b) $i_L$ is assumed being is in its positive half-cycle ($i_L>0$), so flowing towards the grid. In a case when switch 142 fails in open, then in the next few switching cycles, the flying capacitor 127 can only be charged, while 147 can only be discharged, since the charging current would be blocked by the open-circuited switch 142. Accordingly, the voltage difference between $V_{cf1}$ and $V_{cf2}$ is increasing rapidly. The other capacitor voltages may also adapt, but much slower than the two flying capacitors on either side of the failed switch. If switch 142 fails while the current $i_L$ is in the negative half cycle ($i_L<0$), flowing towards the converter, then the converter operation is not affected, since the diode of the switch 142 takes over the operation. Under such a condition, an open circuit failure of the switch 142 cannot be detected immediately. One would have to wait until the positive half-cycle arrives.

If the open-circuit failure happens during the positive half-cycle of the phase-current, the current reduces to zero, and if the open circuit fault happens just before the positive half-cycle arrives, then the current would hover around zero in the positive half-cycle. This happens, because the applied voltage on the phase by the converter will be on an average negative and thus lower than expected. To understand the behaviour in terms of the switching vectors that are applied when the current is in positive direction, due to the un-operational switch, more zero and/or negative vectors get applied to the output—e.g. a sequential "1110" would become "1010"—, the midpoint to converter output voltage (i.e. voltage measured between node 'A' and node 'N', wherein node 'N' is a mid-point node) $V_{mid-out}=+1/4\ V_{dc}$ would become zero, i.e. $V_{mid-out}=0$. If a closed loop current control is presented, the controller will counteract this distortion, resulting in a high voltage imbalance on the flying capacitor voltages.

In rectifier mode and assuming $i_L$ is in the negative-half c cycle ($i_L<0$), the converter would still behave normally (like a boost converter), even if switch 142 suffers an open-circuit failure since the diode of switch 142 is still operating, and thus the open circuit failure of switch 142 cannot be detected. If $i_L$ is in the positive-half cycle ($i_L>0$), the converter behaves like a regular-diode rectifier, since switch 142 is not operating and thus behaves like a diode only and switch 144 when turned-on, would only take the current of its diode that is flowing in the same direction. This results in a pure diode rectifier type of phase that will have significant distortion.

FIG. 2b shows schematically an example of a short-circuit failure in an example cell 140. A switch can fail by itself, and/or it may be possible that a gate drive circuit of the switch has failed. Either case may lead to a possible situation that the switch has failed in short circuit. In this scenario, the direction of the sinusoidal phase current $i_L$ is considered positive ($i_L>0$), and towards the grid if its flowing in the direction as shown in FIG. 1. In the negative half-cycle ($i_L<0$), this direction reverses and the phase current is flowing towards the converter.

If, e.g. switch 142 fails in short-circuit, and switch 144 is turned on, a high current will flow through the two switches switch 142 and switch 144, charging capacitor 147 and discharging capacitor 127, as shown in FIG. 2b. Accordingly, $V_{cf1}$ will fall and $V_{cf2}$ will rise until both capacitors have the same voltage. This error is independent of the direction of $i_L$. Assuming that the semiconductors are not destroyed during the recharging process of the two now short-circuited flying capacitors, the short-circuit fault has no big impact on the output current. In the considered case, the system changes from a five to a four-level system and therefore higher distortions in the output current will be observed due to the increased switched voltage or reduced voltage-levels at the converter's output. However, this may not be the case and the overcurrent in the switches at the instant of fault could cause overheating to such an extent that switch will be destroyed and the system can no longer operate normally. In short-circuit failure, the cases of inverter and rectifier operation may not needed to be separated.

As discussed above, there are two error cases considered for a flying capacitor converter: a device failing in open circuit or in short circuit. For the following, an n-level flying capacitor converter system is considered, with the capacitor 127 at the highest voltage $V_{cf1}$, and $C_{f(n-2)}$ with the lowest flying capacitor voltage, $V_{cf(n-2)}$. To keep the annotation simple, the DC-link capacitors 112, 114 are is also considered as a flying capacitor with voltage $V_{DC}$. For the sake of completeness, the AC-side output terminal voltage is $V_{cf(n-1)}=0$ V, and the capacitance $C_{f(n-1)}=\infty$.

The system has (n−1) switching cells, whereas—for example—switching cell 140 is located between capacitors 127 and 147. Furthermore, $\Delta_{cfi}$ may be a voltage difference between adjacent flying capacitors, e.g. between capacitors 127 and 147. Under normal operation, there is a nominal and constant voltage difference between two adjacent flying capacitors $\Delta_{cfi}=V_{DC}/(n-1)$. For the error detection and identification of the failed device the measurements of the flying capacitor voltages, the phase currents and the AC-side filter capacitor voltages can be used, which usually are measured anyway for closed loop control of the converter. Alternatively, the voltages across the switches could directly be measured, although this may result in significantly increased measurement effort and cost in terms of hardware.

Figure 4B:
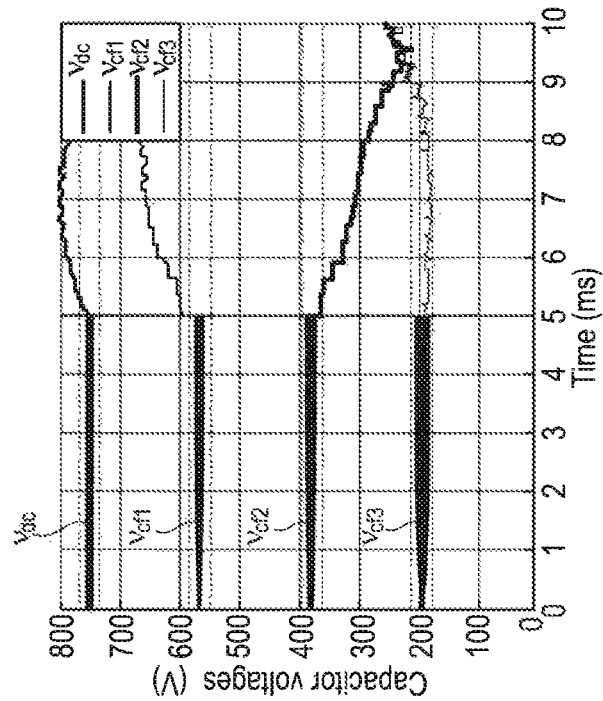
FIG. 4a and FIG. 4b are schematics of exemplary embodiments of inverters operating on a 5-level flying capacitor system.
Figure 4A:
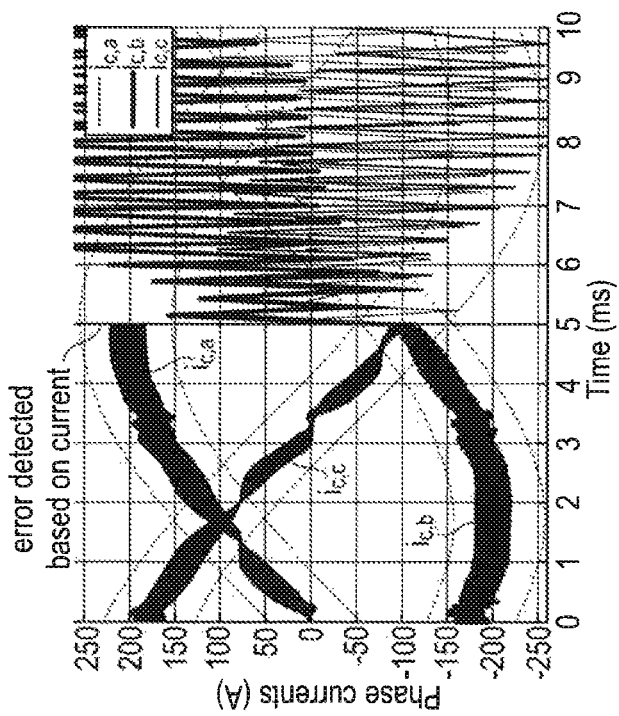
Figure 5B:
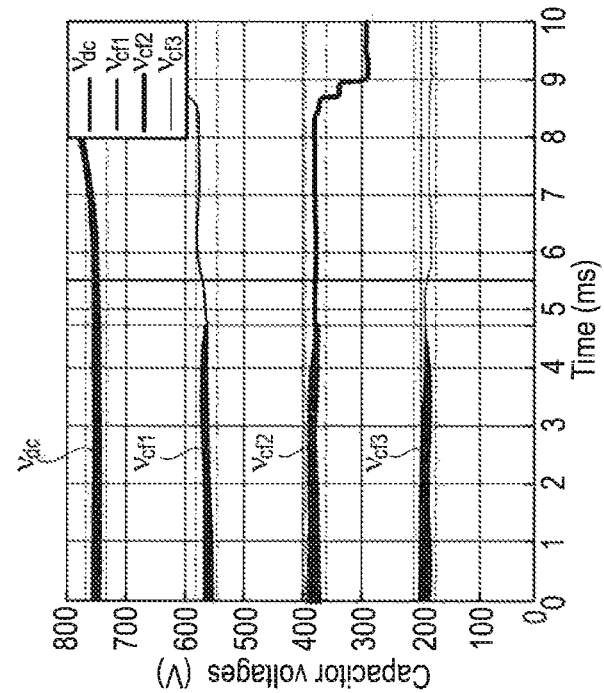
FIG. 5a and FIG. 5b are schematics of examples of alternative embodiments of another inverter operation of a 5-level flying capacitor system in accordance with the disclosure.
Figure 5A:
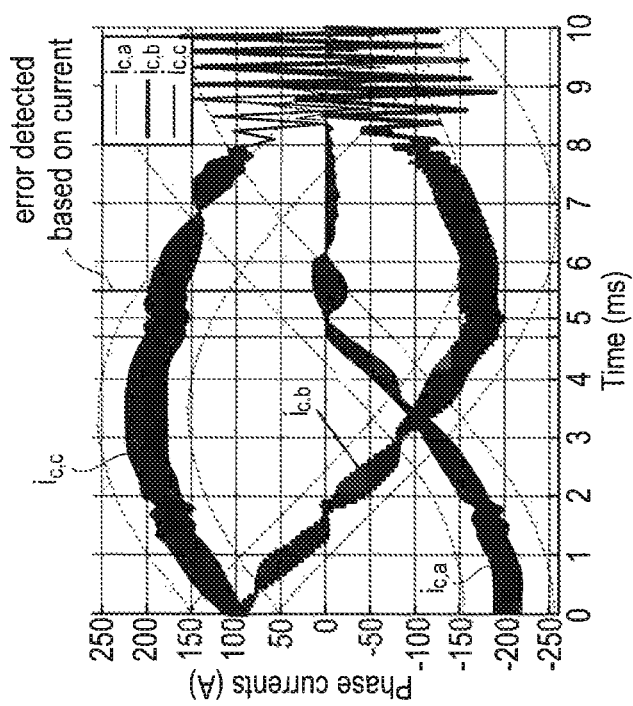

FIGS. 4a and 4b show schematically an example of an inverter operation of a 5-level flying capacitor system 100. FIG. 4a shows inductor currents and FIG. 4b shows capacitor voltages when an open-circuit error in the high side device 142 of switching cell 140 in phase a occurs during the positive half-cycle of $i_{(L,a)}$. FIGS. 5a and 5b show schematically an example of another inverter operation of a 5-level flying capacitor system 100. FIG. 5a shows inductor currents, and FIG. 5b shows capacitor voltages when an open-circuit error in the high side device of switching cell 140 in phase a occurs during the negative half-cycle of $i_{(L,a)}$. The area of about 5.5 ms indicates the time range when the error could have happened.

To detect if a device has failed in an open-circuit and cannot be turned on again, the phase current can be used. FIGS. 4a, 4b, 5a and 5b depict the situation when the high side device switch 142 (see, e.g., FIG. 1) in switching cell 140 of the phase, say phase A of a 3-phase inverter/rectifier, is failing. As seen in all figures, the phase current can be used to detect an open circuit fault in the switch, for example by comparing it to a reference band as illustrated with dashed lines. Alternatively, other measurements can be used to detect an error. However, at the time instant of the fault detection the deviation of the capacitor voltages may be too slow to allow a speedy identification of the switch failure. In the considered example this is especially the case if the open-circuit with high side device switch 142 fault happens during the negative half-cycle of the current (see FIGS. 4a-5b). Therefore, information from the current sensor may be used to instead.

FIGS. 6a and 6b show schematically an example of a rectifier operation of a 5-level flying capacitor system. FIG. 6a shows inductor currents, and FIG. 6b shows capacitor voltages when an open-circuit error in the high side device of switching cell 140 in phase A occurs during the positive half-cycle of $i_{(L,a)}$. FIGS. 7a and 7b show schematically an example of another rectifier operation of a 5-level flying capacitor system. FIG. 7a shows inductor currents, and FIG. 7b shows capacitor voltages when an open-circuit error in the high side device of switching cell 140 in phase a occurs during the negative half-cycle of $i_{(L,a)}$. The area of about 5.5 ms indicates the time range when the error could have happened.

FIGS. 8a and 8b show schematically examples of test vectors to identify a faulty switching cell. FIG. 8a shows a sequence of switching vectors, and FIG. 8b shows two switching vectors.

The faulty switching cell may be identified by measuring the deviation in flying capacitor voltages:

$$\text{if } \Delta v_{cfi} = \max\left([\Delta v_{cfj}]_{j=1}^{n-1}\right) \rightarrow \text{error in cell } i$$

However, as shown in FIGS. 5a, 5b and FIGS. 7a, 7b, the deviation on the flying capacitor voltage may, in some cases, not be significant enough. Thus, after turning off the converter system and disconnect it from the grid, or another power source rectified to DC, a diagnostic procedure might be necessary in order to identify the faulty switching cell. In this procedure, for the purpose of cell identification a sequence of switching vectors can be applied on the faulty phase or all phases after disconnecting the system from the grid. Two examples of such switching vector sequences are shown next to further explain the idea.

Example 1

In FIG. 8a at $t_0$, after an open circuit fault in switch 162 has occurred. This fault is detected, and the converter is turned off and disconnected from the grid. To identify where exactly the fault has developed, a sequence of switching vectors is applied by cycling the phase voltage from a maximum possible negative voltage level to the maximum possible positive voltage level. The faulty switching cell can be found by either measuring the flying capacitor voltage or the converter output voltage. For example, at $t_3$, switch 162 should be switched on but it stays open due to the fault. Thus, no change in the difference of flying capacitor voltages $V_{cf}$ nor any change in the phase voltage is seen and thus, the failed device is identified.

Example 2

In FIG. 8b at $t_0$, after an open circuit fault in switch 162 has occurred. This fault is detected, and the converter is turned off and disconnected from the grid. To identify where exactly the fault has developed, a sequence of switching vectors is applied, first all low side devices are turned on at $t_1$, afterwards at $t_2$ all high side devices are turned on. Since switch 162 cannot be turned on again, the voltage difference $\Delta V$ in the flying capacitor voltages $V_{cf2}$ (charged) and $V_{cf3}$ (discharged) can be observed and accordingly the faulty switching cell can be identified. If the direction of current was known when the fault was detected, then even the faulty device within that cell can be identified, say for the purpose of service and maintenance.

There may be further alternative sequences of switching vectors that can be applied, whereas the faulty cell or device can be found by measuring the flying capacitor voltages, converter output voltage or the phase current. To ensure a proper identification of the faulty switching cell, this procedure might be applied to all the phases, to remove any phase ambiguity.

Additionally or as an alternative, the voltages across all individual switches (e.g. the positive or negative terminals of adjacent flying capacitors) may be measured. These measured voltages may be compared to the current switching state such that an open circuit (or short circuit) can be immediately detected by comparing it to the current switching state. However, for each switch one voltage measurement is required. Thus, for a n-level system 2·(n−1) voltage measurements, instead of (n−2) voltage measurements, for the flying capacitors are required.

In case of a short-circuit failure in cell i, the voltage $v_{cf(i-1)}$ will immediately fall and $v_{cfi}$ will raise until they are equal. Assuming the devices are not destroyed, the phase current will not be affected, except for higher distortions due to imbalanced flying capacitor voltages and missing voltage level. In a short-circuit fault, first the imbalance of the flying capacitor voltages is detected, and an error signal is generated. Across the faulty cell the voltage difference between the neighbouring flying capacitors, $\Delta v_{cfi}$, will be quickly reduced to almost zero. This allows to determine the faulty phase and identify the affected switching cell:

$$\text{if } \Delta v_{cfi} = \min\left([\Delta v_{cfj}]_{j=1}^{n-1}\right) \rightarrow \text{error in cell } i$$

FIG. 9a-9b show schematically characteristic waveforms when a short circuit error in a switching cell occurs. FIG. 9a shows phase voltages of the grid, FIG. 9b shows inductor currents, FIG. 9c shows capacitor voltages, and FIG. 9d shows voltage differences between adjacent capacitors.

FIG. 9a-9d show the waveforms for a short-circuit fault in cell 140 of phase A (such as the one shown in FIG. 1) of a 3-phase 5-level flying capacitor converter system 100. Immediately after the fault happens the flying capacitor voltages on either side of the faulted cell will start changing, as show in FIG. 9c. Although it is possible to detect the short-circuit with the measured absolute voltage of the flying capacitors, again the difference of voltage between the adjacent flying capacitors may be used, as shown in FIG. 9d. It clearly shows a possible problem with cell 140, since here $\Delta V_{cf2} = v_{cf1} - v_{cf2}$ has reduced to almost zero. This fast change in the voltage can be used for error detection and at the same time to identify the faulty cell, cell 140 in this case. The phase current is almost not affected by this fault except for a higher current ripple. As mentioned above in the open circuit detection, alternative the voltage across each individual MOSFET could be measured to detect and identify the failed device.

Figure 3:
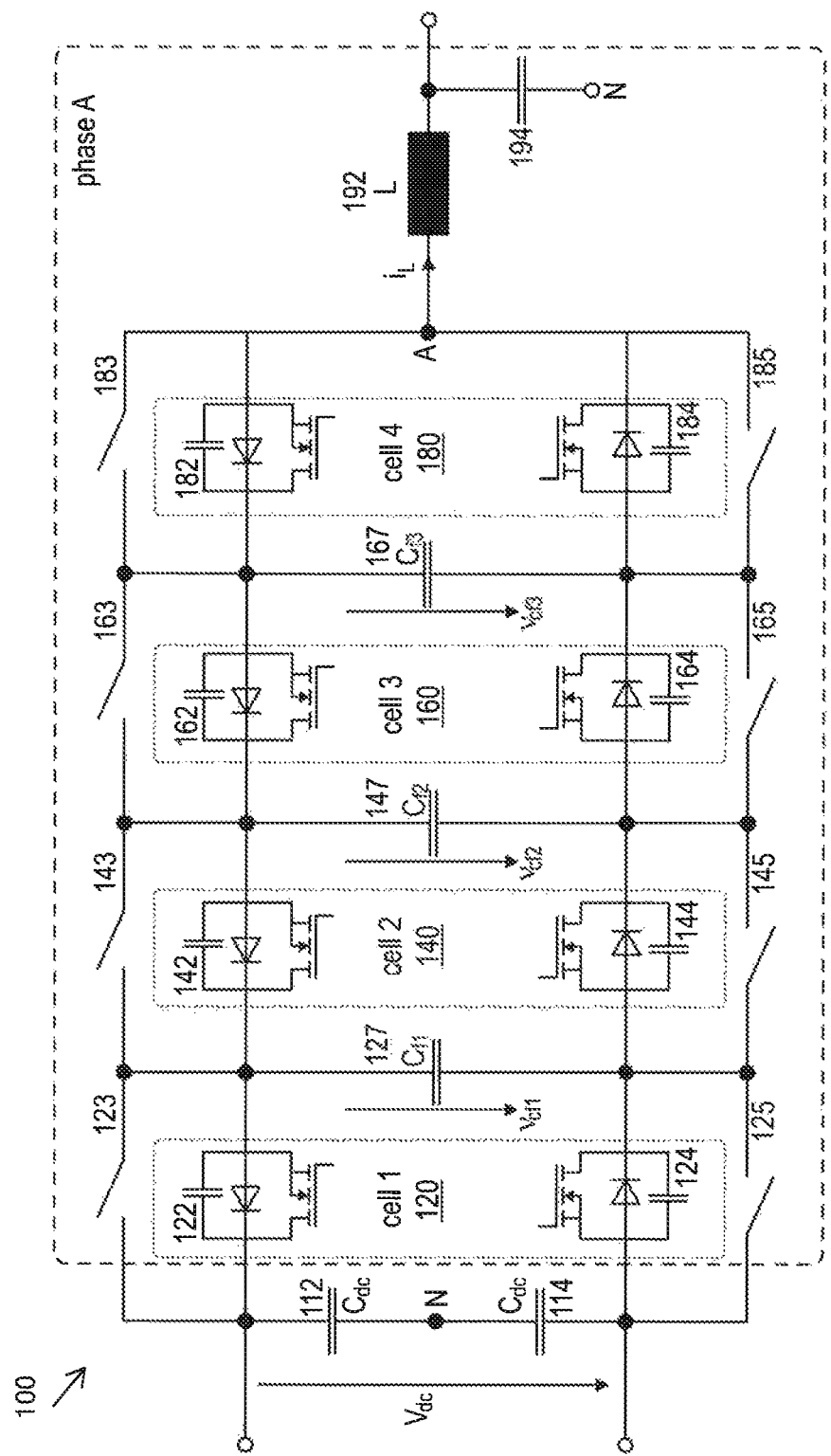
FIG. 3 is a schematic of an exemplary embodiment of a flying capacitor converter in accordance with the disclosure.

FIG. 3 schematically shows an example of a flying capacitor converter 100 according to an embodiment. Compared to FIG. 1, first bypass switches 123, 143, 163, 183 and second bypass switches 125, 145, 165, 185 are arranged in parallel to the respective first converter switches 122, 142, 162, 182 and the respective second converter switches 124, 144, 164, 184. Using this architecture, once the faulty switching cell is identified, the converter may be reconfigured to work with one cell less. The converter is provided with bypass switches in parallel to the main switches. These switches may be of any type, semiconductors, relays etc. as shown in FIG. 3. Additional semiconductors to disconnect the flying capacitors may be inserted, but are not obligatory. To bypass one switching cell, all semiconductors in this cell need to be bypassed, e.g. if cell 140 has to be bypassed, bypass switches 143 and 145 need to be closed.

First, the capacitors need to be discharged (either partially of completely) to provide safe conditions for the reconfiguration of the converter system. Afterwards, all semiconductors of the faulty switching cell are shorted by the bypass switches. Now the system is a (n−1)-level system, since it has reduced from n+1 cells to n cells, thus the modulation has to be adapted too, e.g. in the standard phase-shifted carrier modulation, the carrier for the faulty switching cell has to be removed and the phase shift between the remaining carriers needs to be adjusted. Afterwards, the system can be restarted. This means the flying capacitors need to be charged again. Finally, the power conversion can be continued.

FIG. 10 shows schematically a fault handling strategy 200. With the methods described above a single switch fault can be detected, identified and the system can be reconfigured. The whole process can be summarized as follows: In 210, once the error is detected, the system is stopped and then disconnected from the grid in order to protect the devices from over-voltages and/or over-currents. In 220, it is determined if it is an open-circuit error (222) or a short-circuit error (224). In case of a short-circuit error, the identification of the faulty switching cell can easily be done by measuring the flying capacitor voltages. In case of an open-circuit error a diagnostic procedure, e.g. executing a sequence of switching vectors as described above, can be applied to identify the faulty switching cell. In 230, the flying capacitors are either fully discharged or to values at which a safe bypassing of the faulty switching cell by bypass switches is possible. Since now one switching cell is bypassed the converter has (n−1) voltage levels and accordingly the modulation scheme needs to be adapted too. Once this is done, the system can be restarted, in 240. Before continuing the power conversion, in 240, there may be an initial check of the functionalities in the converter system.

FIG. 11 shows a flow diagram 900 according to an embodiment. In a step 902 a faulty converter level is detected, wherein the faulty converter level comprises the first converter switch 122, 142, 162, 182 (see, e.g., FIG. 1) and/or the second converter switch 124, 144, 164, 184 being faulty. In an optional step 904, the multi-level converter are disconnected from an input voltage. In a step 906 all capacitors arranged in parallel to the input of the multi-level converter are discharged, wherein all capacitors 127, 147, 167 comprise the converter capacitors and an input capacitor 112, 114. In a step 908, the first bypass switch and the second bypass switch of the faulty converter level are closed. In a step 910, a modulation of the converter switches of the other converter levels is adapted. In a step 912, the multi-level converter is restarted. In an optional step 914, an initial check of the multi-level converter is conducted. In an optional step 916, the multi-level converter continues to run.

The multi-level flying capacitor converter basically comprises a plurality of "levels", each of these levels comprising a "flying capacitor" or converter capacitor, which is charged by one or two switches upstream and discharged by the one or two switches downstream. The "flying capacitor" or converter capacitor is arranged in parallel to the input of the multi-level converter. Each of the one or two switches—i.e. the first converter switch and, optionally, the second converter switch—is arranged between a first end or a second end of the converter capacitor respectively. The first bypass switch and the (optional, if there is a second converter switch) second bypass switch are arranged in parallel to the respective first converter switch and the respective second converter switch. The converter switch may be implemented by a semiconductor, for instance by a FET, e.g. a MOSFET (metal-oxide-semiconductor field-effect transistor), or an IGBT (insulated gate bi-polar junction transistor). At least in some embodiments, a capacitor may be arranged in parallel to the converter switch, to improve the electrical behaviour. At least in some embodiments, the converter capacitor, which would be directly connected to the one or two switches of the last level, may be lacking. In some embodiments, there may be an output low-pass after the last level, the low-pass comprising an inductor followed by a capacitor.

A faulty converter level is a level of the multi-level converter, which has a faulty first converter switch and/or a faulty second converter switch. For most multi-level converters, it may be a rare event that both converter switch become faulty at the same time. Detecting a faulty converter level may include to identify the faulty converter switch and/or the kind of fault, i.e. an open-circuit failure or short circuit failure. Once an error—i.e. the faulty converter level—is detected, the system may be stopped and then disconnected from the grid (e.g. AC grid, or another (rectified) DC input voltage) in order to protect the devices from over-voltages and/or over-currents. After detecting a faulty converter level, all capacitors arranged in parallel to the input of the multi-level converter are discharged. The term "all capacitors" may—besides the converter capacitors—also comprise more capacitors, e.g. also one or more input capacitor(s) and/or one or more output capacitor(s). The discharging may, for instance, be performed by closing all the bypass switches, and/or by other means. The discharging may be a complete or a partial discharging, at least to a charging-level where a safe bypassing of the faulty switching cell by bypass switches is possible.

After the discharging, all switches of the faulty switching cell are shorted by the bypass switches, by closing the first bypass switch and the (optional) second bypass switch of the faulty converter level. Shorting the bypass switches reduces one level of the multi-level converter, i.e. it makes the n-level converter an (n−1)-level converter. After the shorting—done by closing the bypass switch(es)—the modulation of the converter switches of the other (or "remaining") converter levels has to be adapted. The adapting of the modulation may comprise removing the carrier for the faulty switching cell, and adjusting the phase shift between the remaining carriers, i.e. of the remaining levels. With this adapted modulation, the multi-level converter may be restarted. The restarting may be followed by continuing to run the multi-level converter.

This method increases the availability of the multi-level flying capacitor converter significantly, because a faulty switch does not immediately lead to a fail of the multi-level converter. Moreover, a multi-level converter, which may be selected for behavioural reasons, may additionally bring the benefit of higher availability and/or reliability. Using the architecture described above and/or below, the multi-level converters may—depending on the number of levels—even tolerate a double failure or even a failure of a higher degree.

In various embodiments, the method further comprises the step of conducting an initial check of the multi-level converter before continuing to run the multi-level converter. The initial check may comprise to check the functionalities in the converter system, for instance to check—after the capacitors have been charged again—if their voltages are balanced.

In various embodiments, a detecting of the faulty converter level may be performed, wherein the faulty converter level comprises the first converter switch and/or the second converter switch being faulty. The converter switch may have a short-circuit error or an open-circuit error.

In various embodiments, the identifying the converter switch having an open-circuit error comprises to measure a maximum voltage at one of the converter capacitors, and/or to apply a sequence of switching vectors to the switches of the multi-level flying capacitor converter. Details are given below.

In various embodiments, the identifying the converter switch having a short-circuit error comprises to measure a zero difference voltage between two of the converter capacitors. Details are given below.

An aspect relates to a multi-level flying capacitor converter for DC/AC converting, wherein each converter level of the multi-level converter comprises: a converter capacitor, arranged in parallel to an input of the multi-level converter; a first converter switch and a second converter switch, arranged between a first end or a second end of the converter capacitor respectively; a first bypass switch and a second bypass switch, arranged in parallel to the respective first converter switch and the respective second converter switch; and a control unit configured for conducting a method as described above and/or below.

In various embodiments, the multi-level converter comprises between 2 and 10 converter levels, particularly between 3 and 6 converter levels. More levels may lead to a smoother behaviour of the multi-level converter. However, additional steps may also increase the costs for the converter. Hence, it turned out that a good compromise may be to use between 3 and 6 converter levels, for instance 4 or 5 converter levels. In combination with the architecture described above and/or below, this also provides sufficient "reserve" in case of a single failure, or even of a failure of a higher degree.

In various embodiments, the multi-level converter further comprises an input capacitor and/or an output low-pass. The output low-pass may comprise an inductor arranged in series to the output and a capacitor arranged in parallel to the output, e.g. after the inductor. This may contribute to less distortion or harmonic distortion of the output signal of the multi-level converter.

An aspect relates to a computer program product comprising instructions, which, when the program is executed by a control unit, cause the control unit to carry out the method as described above and/or below.

An aspect relates to a computer-readable storage medium where a computer program or a computer program product as described above is stored on.

An aspect relates to a use of a multi-level converter described above and/or below or a method described above and/or below for a PV (photovoltaic) inverter, UPS (uninterrupted power supply) systems, high-speed drives or motors, BESS (battery energy storage system), EV (electric vehicle) charging, and/or further DC/AC converting systems.

For further clarification, the invention is described by means of embodiments shown in the figures. These embodiments are to be considered as examples only, but not as limiting.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for compensating a faulty switch in a multi-level flying capacitor converter, wherein each converter level of the multi-level flying capacitor converter comprises:
 a converter capacitor arranged in parallel to an input of the multi-level flying capacitor converter;
 a first converter switch and a second converter switch, the first converter switch being arranged between a first end of the converter capacitor, and the second converter switch being arranged between a second end of the converter capacitor;
 a first bypass switch arranged in parallel to the first converter switch; and
 a second bypass switch arranged in parallel to second converter switch;
 wherein the method comprises:
 detecting a faulty converter level, wherein the faulty converter level comprises at least one of the first converter switch and the second converter switch being faulty;
 stopping the multi-level flying capacitor converter;
 discharging all capacitors arranged in parallel to the input of the multi-level flying capacitor converter, wherein all capacitors comprise the converter capacitors, an input capacitor, and an output capacitor;

closing the first bypass switch and the second bypass switch of a level containing the first or second converter switch that is faulty;

adapting a modulation of the first and second converter switches of other converter levels by adjusting a phase shift between the other converter levels; and restarting the multi-level flying capacitor converter.

2. The method of claim 1, further comprising continuing to run the multi-level flying capacitor converter.

3. The method of claim 1, further comprising disconnecting the multi-level flying capacitor converter from an input voltage before discharging all capacitors.

4. The method of claim 1, further comprising conducting an initial check of the multi-level flying capacitor converter before continuing to run the multi-level flying capacitor converter.

5. The method of claim 1, wherein discharging all capacitors comprises discharging the capacitors at least partially.

6. The method of claim 1, wherein detecting the faulty converter level comprises identifying the first converter switch and/or the second converter switch having a short-circuit error or an open-circuit error.

7. The method of claim 6, wherein identifying the first converter switch and/or the second converter switch having the open-circuit error comprises measuring a maximum voltage at one of the converter capacitors, and applying a sequence of switching vectors to all switches of the multi-level flying capacitor converter.

8. The method of claim 6, wherein identifying the first converter switch and/or the second converter switch having the short-circuit error comprises measuring a zero difference voltage between two of the converter capacitors.

9. A multi-level flying capacitor converter for DC/AC converting having a plurality of converter levels, wherein each converter level of the plurality of converter levels comprises:

a converter capacitor arranged in parallel to an input of the multi-level flying capacitor converter;

a first converter switch and a second converter switch that are arranged between a first end and a second end of the converter capacitor respectively;

a first bypass switch and a second bypass switch that are arranged in parallel to the respective first converter switch and to the respective second converter switch; and a control unit configured for:

detecting a faulty converter level, wherein the faulty converter level comprises at least one of the first converter switch and the second converter switch being faulty;

stopping the multi-level flying capacitor converter;

discharging all capacitors arranged in parallel to the input of the multi-level flying capacitor converter, wherein all capacitors comprise the converter capacitors, an input capacitor, and an output capacitor;

closing the first bypass switch and the second bypass switch of a level containing the first or second converter switch that is faulty;

adapting a modulation of the first and second converter switches of other converter levels; and restarting the multi-level flying capacitor converter.

10. The multi-level flying capacitor converter of claim 9, wherein the multi-level flying capacitor converter comprises between 2 and 10 converter levels.

11. The multi-level flying capacitor converter of claim 9, wherein the multi-level flying capacitor converter comprises between 3 and 6 converter levels.

12. The multi-level flying capacitor converter of claim 9, further comprising at least one of:

the input capacitor; and an output low-pass.

\* \* \* \* \*